Patented Dec. 27, 1949

2,492,192

UNITED STATES PATENT OFFICE 2,492,192

$\Delta^{17,20}$-3,21-DIOXY-11-KETOPREGNENES AND PROCESS

Lewis H. Sarett, Princeton, N. J., assignor to Merck & Co., Inc., Rahway, N. J., a corporation of New Jersey No Drawing. Application February 23, 1946, Serial No. 649,764

7 Claims. (Cl. 260—397.4)

This invention is concerned generally with novel chemical compounds of the cyclopentanodimethylpolyhydrophenanthrene series and to processes of preparing same; more particularly it relates to novel compounds useful as intermediates in the synthesis of the adrenal cortical hormone $\Delta 4,5$-3,11,20-triketo-17($\beta$), 21-dihydroxy pregnene. This application is a continuation-in-part of copending application Serial No. 605,194, filed July 14, 1945, now abandoned.

This hormone is known to occur naturally in the adrenal cortex; it has the structural formula:

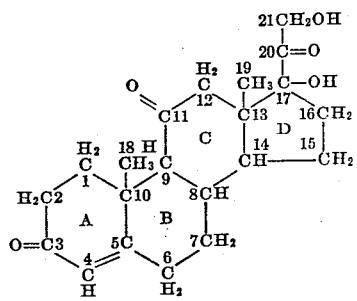

(Standard numbering of C-positions.)

This formula, for purposes of convenience, is hereinafter reproduced below in the abbreviated form:

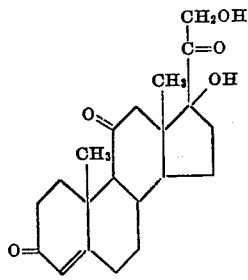

In the following description of the invention, the stereochemical relationships of substituents are indicated by the following conventions:

1. A substituent at the C-3 position which is trans to the C-10 methyl group is parenthetically designated ($\alpha$).
2. A substituent at the C-17 position, the stereochemical configuration of which is identical with that of the naturally occurring adrenal hormones, is parenthetically designated ($\beta$); the epimeric configuration is designated ($\alpha$). In the structural formulae the former configuration is shown by writing the C-17 substituent (hydroxyl) to the right of the C-17 carbon side chain, thus

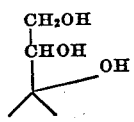

in the latter case above the side chain, thus

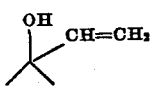

3. The stereochemical relationship of rings A and B is indicated in the formulae by a solid line representing the valence bond in the cis configuration.

In accordance with the present invention it is now found this hormone can be synthesized by reactions indicated as follows:

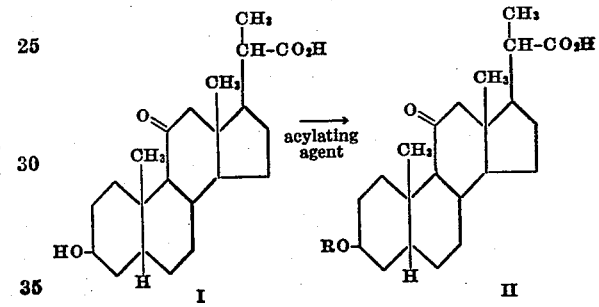

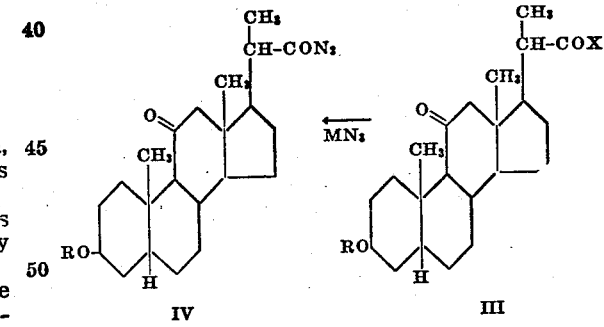

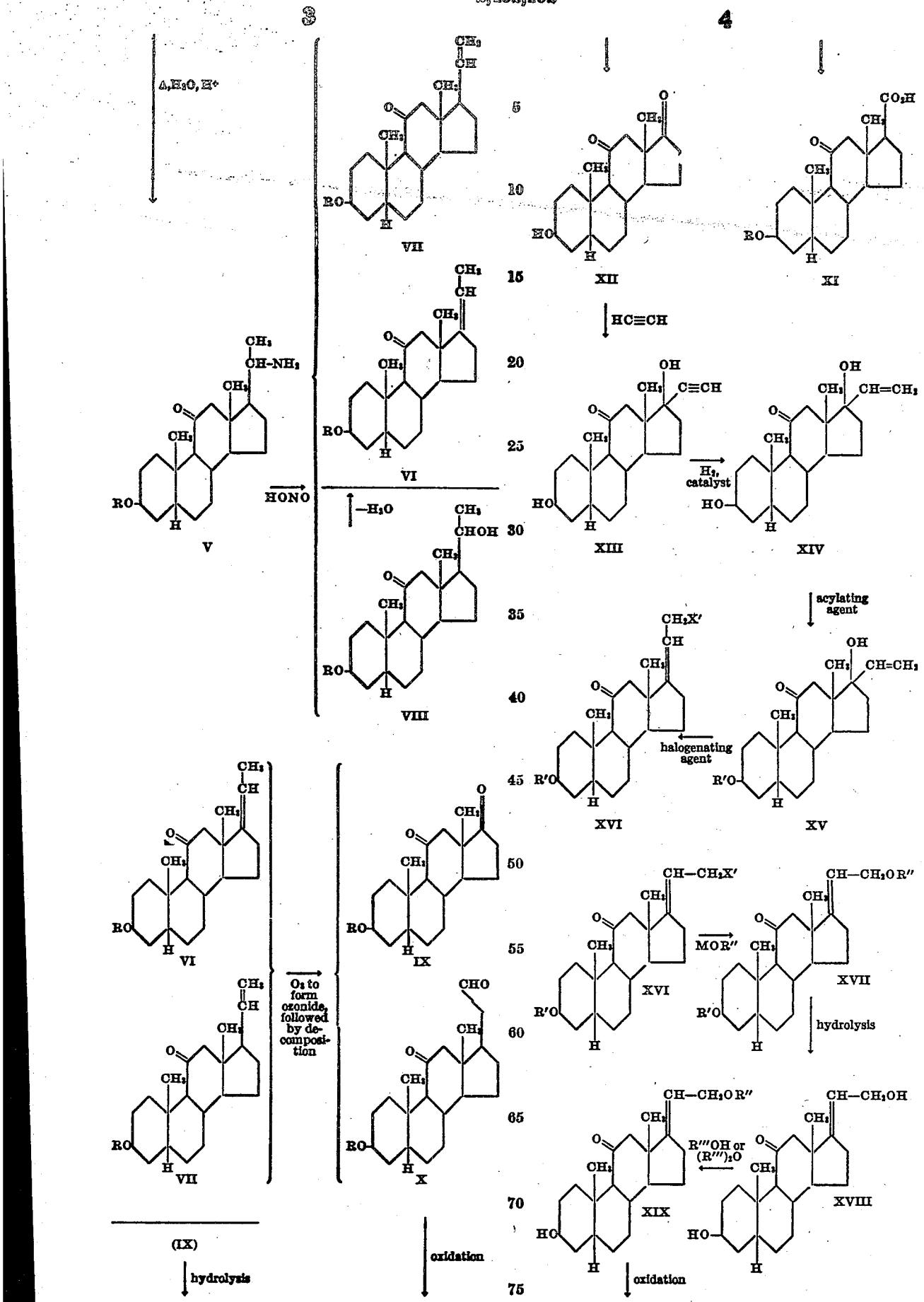

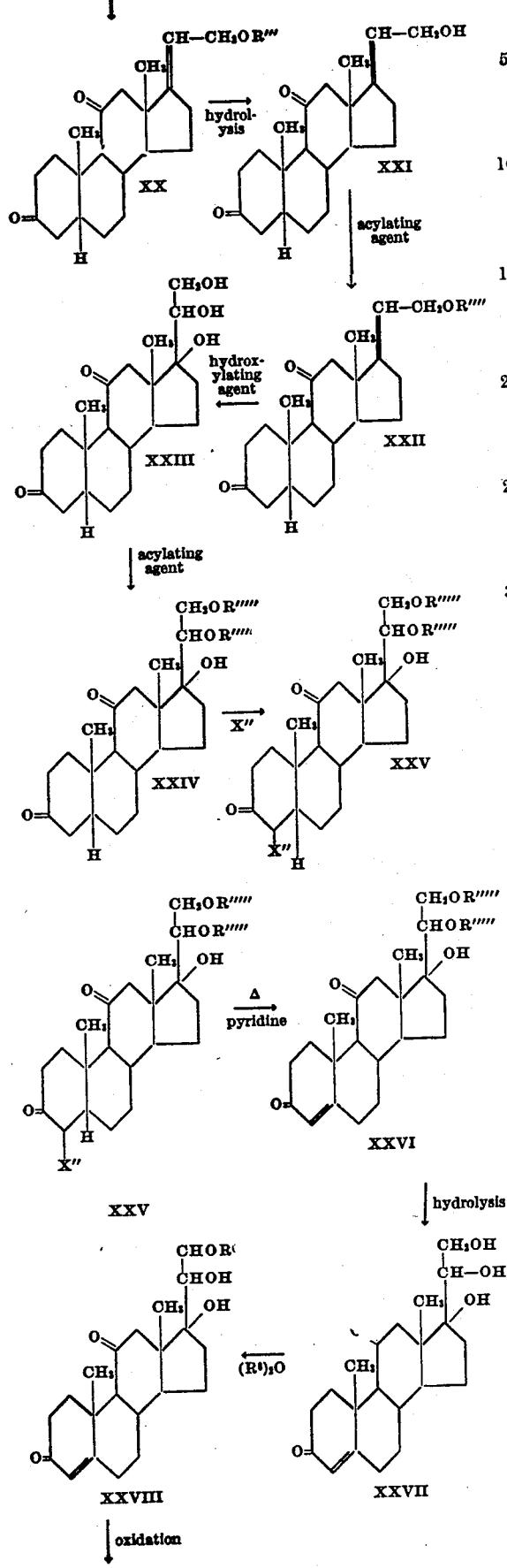

In the above formulae, R, R', R'', R''', R'''', R''''', and R⁶ are acyl; X, X', and X'' are halogen; and M is an alkali metal or an alkaline earth metal /2.

The reactions above indicated are conducted as follows:

3-hydroxy-11-keto-bisnorcholanic acid (I) is acylated producing 3-acyloxy - 11 - keto-bisnor-cholanic acid (II) which is treated with an agent capable of converting an organic carboxylic acid to the corresponding acid halide, thus forming the acid halide of 3-acyloxy-11-keto-bisnor-cholanic acid (III). Upon treatment of this acid halide with an alkali metal azide or alkaline earth metal azide, the azide of 3-acyloxy-11-keto-bisnorcholanic acid (IV) is formed. Decomposition of this azide with an acidic aqueous solution produces 3-acyloxy-11-keto-20-amino-pregnane (V).

Upon treatment of this compound (V) with nitrous acid, a mixture containing predominantly $\Delta^{17,20}$-3-acyloxy - 11 - keto-pregnene (VI) and $\Delta^{20,21}$-3-acyloxy-11-keto-pregnene (VII) and a minor amount of 3-acyloxy-11-keto-20-hydroxy-pregnane (VIII) results. The proportion of the desired compound (VI) present in this mixture can be increased by treating the mixture with an aromatic sulfonyl halide followed by further treatment with a base to cause removal of the elements of the corresponding aromatic sulfonic acid. The mixture of these compounds (VI) and (VII) or of (VI), (VII) and (VIII), is then treated with ozone followed by decomposition of the ozonide, producing 3-acyloxy-11,17-diketo-etiocholane (IX) and 3-acyloxy-11-keto-17-formyletiocholane (X). Compound (X) is oxidized to 3-acyloxy-11-ketoetiocholanic acid (XI) which is separated from compound (IX) by extraction with alkali.

Compound (IX) is hydrolyzed to form 3-hydroxy-11,17-diketoetiocholane (XII) which is treated with acetylene to form 3,17-dihydroxy-11-keto-pregnine-20 (XIII). This compound (XIII) is catalytically hydrogenated to produce $\Delta^{20,21}$-3,17-dihydroxy - 11 - ketopregnene (XIV) which is acylated to form $\Delta^{20,21}$-3-acyloxy-17- hydroxy-11-ketopregnene (XV), and this compound is halogenated to produce Δ$^{17,20}$-3-acyloxy-11-keto-21-halopregnene (XVI). When treated with an alkali metal salt or alkaline earth metal salt of an organic acid, this compound yields Δ$^{17,20}$-3-21-diacyloxy-11-ketopregnene (XVII) which is hydrolyzed producing Δ$^{17,20}$-3-21-dihydroxy-11-ketopregnene (XVIII). The latter product (XVIII) is partially esterified and the mono ester (XIX) thus produced is oxidized to convert the unesterified hydroxy group in the 3 position to a keto group, thereby yielding the ester of Δ$^{17,20}$-3,11-diketo-21-acyloxy-pregnene (XX). This product (XX) is hydrolyzed and the Δ$^{17,20}$-3,11-diketo-21-hydroxypregnene (XXI) thus formed is acylated producing Δ$^{17,20}$-3,11-diketo-21-acyloxypregnene (XXII). Hydroxylation at the unsaturation of the last mentioned compound (XXII) results in the production of 3,11-diketo-17(β),20,21-trihydroxypregnene (XXIII) which is then acylated to form 3,11-diketo-17(β)-hydroxy-20,21-diacyloxypregnene (XXIV). When brominated, this compound yields 3,11-diketo-4-bromo-17(β)-hydroxy-20,21-diacyloxypregnene (XXV).

This compound is then treated with a reagent capable of removing the elements of hydrogen bromide, thereby producing Δ$^{4,5}$-3,11-diketo-17(β)-hydroxy-20,21-diacyloxypregnene (XXVI) which on hydrolysis forms Δ$^{4,5}$-3,11-diketo-17(β)-20,21-trihydroxypregnene (XXVII). Partial acylation of this compound (XXVII) gives Δ$^{4,5}$-3,11-diketo-17(β),20-dihydroxy-21-acyloxy-pregnene (XXVIII) which, when oxidized, yields a mixture of Δ$^{4,5}$-3,11,20-triketo-17(β)-hydroxy-21-acyloxypregnene (XXIX) and Δ$^{4,5}$-3,11,17-triketo androstene (XXX). Compounds (XXIX) and (XXX) may be separated by conventional operations, for example chromatography, and compound (XXIX) hydrolyzed to produce the desired adrenal hormone, Δ$^{4,5}$-3,11,20-triketo-17(β),21-dihydroxypregnene.

This invention is concerned with compounds of the type represented by intermediates 17, 18 and 19 above, and with processes of producing same. Intermediates 17 and 18 can be represented by the formula:

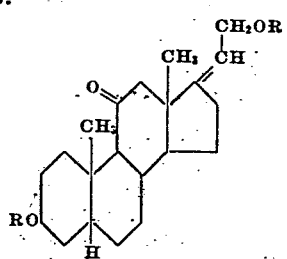

in which R is acyl or hydrogen, and intermediate 19 can be represented by the formula:

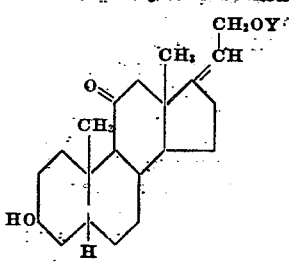

in which Y is a group capable of being readily converted to a hydroxy group, which is not readily oxidized.

The starting material employed in the process according to this invention, a Δ$^{17,20}$-3-acyloxy-11-keto-21-halopregnene, may be obtained as described in copending application Serial No. 649,763, filed February 23, 1946.

In accordance with this invention, a compound of the formula:

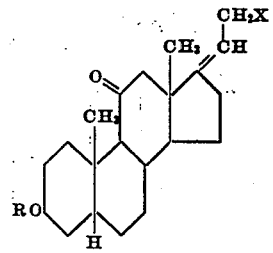

in which R is hydrogen or acyl and X is halogen, is reacted with an alkali metal salt of, or alkaline earth metal salt of, a lower aliphatic carboxylic acid such as acetic, propionic, or butyric acid; the reaction being carried out in a solvent in which the metal salt has appreciable solubility, e. g., acetone, whereby the 21-halogen substituent is replaced by an acyloxy group to yield a compound having the structural formula:

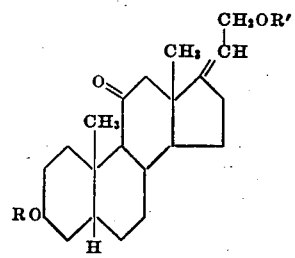

wherein R is as above and R' is the radical of the selected lower aliphatic carboxylic acid salt employed.

The acyloxy group in the 3 position, as disclosed in said application Serial No. 649,763, may be that derived from acetic, propionic, butyric, valeric, caproic, capric, etc., benzoic, toluic or phenyl acetic acid. Particularly preferred compounds are those derived from the lower aliphatic acids, e. g., those having 6 carbon atoms or less.

In further practice of the presently invented process, the two acyloxy groups, represented by R and R' above, are hydrolyzed by treatment with alkai to form Δ$^{17,20}$-3,21-dihydroxy-11-ketopregnene, and this compound is then treated with an esterification agent capable of reacting with the 21-hydroxy group, e. g., an acid or anhydride of an acid such as succinic, acetic, phthalic, or benzoic acid or succinc, acetic or phthalic anhydride. Monobasic or dibasic acids or anhydrides may be used, either of the aliphatic or aromatic series, however, a dibasic aliphatic acid anhydride is preferred. Inasmuch as it is desired to produce an oxidation-resistant product, the reagent selected is chosen with this end in view, and of this class of dibasic aliphatic anhydrides the preferred reagent is succinic anhydride. There is thus produced a compound having the formula:

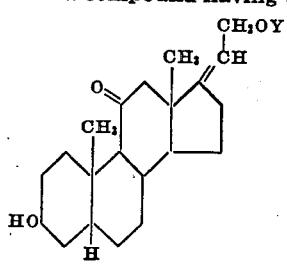

in which Y is the oxidation-resistant group, above described, which can readily be converted to a hydroxy group.

It has been found that when using the reagents above mentioned in these operations, the acylating agent reacts preferentially with the 21-hydroxy group, instead of with the 3-hydroxy group, to form $\Delta^{17,20}$-3-hydroxy-11-keto-21-acyloxypregnene, particularly when the acylation is carried out under mild conditions, e. g., at or below room temperature and preferably in the presence of a solvent such as pyridine.

The following is an example illustrative of the practice of this invention; it will be understood this example is not provided as a limitation of the invented process.

Example

To a solution of 130 mg. of $\Delta^{17,20}$-3($\alpha$)-acetoxy-11-keto-21-bromopregnene in 10 cc. of absolute acetone were added 500 mg. of anhydrous potassium acetate and the mixture refluxed 5 hours. The solution was concentrated in vacuo, diluted with water and extracted with ether. The ethereal layer was washed and concentrated in the steam bath. The product, $\Delta^{17,20}$-3($\alpha$),21-diacetoxy-11-ketopregnene, was crystallized from petroleum ether, was obtained in about 90% yield and had a melting point 114° to 115° C.

The diacetate thus obtained was refluxed 15 minutes with 2 N methanolic potassium hydroxide; $\Delta^{17,20}$-3($\alpha$),21-dihydroxy-11-ketopregnene thus obtained in about 100% yield had a melting point of 201° C. and $[\alpha]_D$+45.5°.

To 1.3 cc. of dry pyridine saturated with succinic anhydride at 28.4° C. were added 261 mg. of $\Delta^{17,20}$-3,21-dihydroxy-11-ketopregnene. After two hours at 28.4° C. the solution was treated with water and ether until layer separation took place. The ethereal layer was washed with dilute hydrochloric acid to remove pyridine and then with cold dilute potassium carbonate. The aqueous alkaline layer was separated, acidified and extracted with ether. Concentration of the washed ethereal layer gave 261 mg. of the crude 21-hemisuccinate. After several recrystallizations from dilute acetone the half ester, $\Delta^{17,20}$-3($\alpha$)-hydroxy-11-keto-21-hemisuccinoxypregnene was obtained in about 90% yield, the product melted at 177°–179° C. The mother liquors from these crystallizations may be saponified with any suitable saponifying agent, such as potassium hydroxide or the like, and treated with succinic anhydride as hereinabove disclosed to recover, in the form of the half ester, any of the $\Delta^{17,20}$-3,21-dihydroxy-11-ketopregnene in the mother liquor.

By treatment of $\Delta^{17,20}$-3($\alpha$)-hydroxy-11-keto-21-hemisuccinoxypregnene with an acylating agent, the corresponding 3-acyloxy compounds may be obtained, e. g., by treatment with acetic anhydride $\Delta^{17,20}$-3($\alpha$)-acetoxy-11-keto-21-hemisuccinoxypregnene may be obtained.

While in the example the starting material used was a compound having the 3-acetoxy group in the trans form, a compound having this group in the cis form also may be used as the steric configuration of the group in the 3 position is not important.

The temperatures mentioned in the example are room temperatures unless otherwise indicated. The temperatures, however, are not critical and the reactions may be carried out at higher or lower temperatures; but extremely high temperatures should be avoided because of the likelihood of decomposition of the desired products which may result from operation at such temperatures.

Unless otherwise stated, the reagents can be used in different proportions than are indicated in the above example as the proportions unless otherwise indicated are not critical, although enough of the reagents should be employed to insure substantially complete reaction to produce the desired products.

All melting points in this specification are corrected. The specific rotation for intermediate 18 in acetone solution for the D line of sodium is indicated hereinabove and, as in conventional, it is indicated by the symbol $[\alpha]_D$.

Various changes and modifications might be made in my invention as defined herein without departing from the scope thereof. It is my intention that these changes and modifications, to the extent that they are comprehended within the scope of the appended claims, shall be considered as part of my invention.

What is claimed is:

1. A compound of the formula:

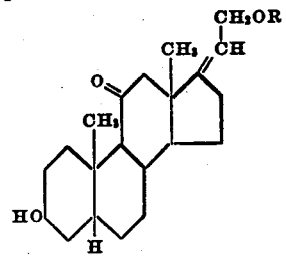

wherein R is acetyl.

2. $\Delta^{17,20}$-3,21-dihydroxy-11-ketopregnene.

3. $\Delta^{17,20}$-3-hydroxy-11-keto-21-hemisuccinoxypregnene.

4. The process that comprises reacting a compound of the cyclopentanoperhydrophenanthrene series having the basic structural formula:

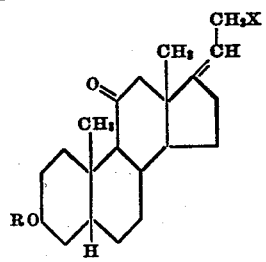

wherein R is acyl and X is halogen, with a substance of the class consisting of alkali-metal salts of lower aliphatic carboxylic acids and alkaline-earth-metal salts of lower aliphatic carboxylic acids whereby the halogen atom of said compound is replaced by a lower aliphatic carboxylic acid radical and saponifying the reaction product to produce a 3,21-dihydroxy compound having the formula:

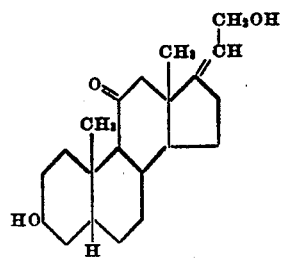

5. A process which comprises reacting $\Delta^{17,20}$-3,21-dihydroxy-11-ketopregnene with an acid anhydride of the group consisting of the anhydrides of monobasic and dibasic lower aliphatic carboxylic acids, to produce Δ$^{17,20}$-3-hydroxy-11-keto-21-acyloxypregnene.

6. The process that comprises reacting Δ$^{17,20}$-3,21-dihydroxy-11-ketopregnene with succinic anhydride and recovering Δ$^{17,20}$-3-hydroxy-11-keto-21-hemisuccinoxypregnene.

7. The process that comprises reacting a compound of the cyclopentanoperhydrophenanthrene series having the basic structural formula:

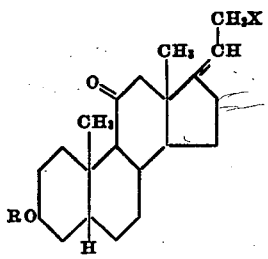

wherein R is acyl and X is halogen, with a substance of the class consisting of alkali-metal salts of lower aliphatic carboxylic acids and alkaline-earth-metal salts of lower aliphatic carboxylic acids whereby the halogen atom of said compound is replaced by a lower aliphatic carboxylic acid radical, saponifying the reaction product thus obtained to yield a 3,21-dihydroxy compound and treating said 3,21-dihydroxy compound with an acid anhydride of the group consisting of the anhydrides of monobasic and dibasic lower aliphatic carboxylic acids to produce Δ$^{17,20}$-3-hydroxy-11-keto-21-acyloxypregnene.

LEWIS H. SARETT.

REFERENCES CITED

The following references are of record in the file of this patent:

UNITED STATES PATENTS

| Number | Name | Date |
|---|---|---|
| 2,239,012 | Miescher | Apr. 22, 1941 |
| 2,305,727 | Miescher | Dec. 22, 1942 |